Jan. 19, 1971  B. ABBOTT ET AL  3,556,555
MOTOR VEHICLE SUSPENSION
Filed Sept. 24, 1968  2 Sheets-Sheet 1

BRIAN ABBOTT
HARRY B. GROVES
DENNIS HARRIS
JOHN B. TURNBULL
INVENTORS

ATTORNEYS

Jan. 19, 1971  B. ABBOTT ET AL  3,556,555
MOTOR VEHICLE SUSPENSION
Filed Sept. 24, 1968  2 Sheets-Sheet 2

BRIAN ABBOTT
HARRY B. GROVES
DENNIS HARRIS
JOHN B. TURNBULL
INVENTORS

BY John R. Faulkner
Clifford L. Sadler
ATTORNEYS

United States Patent Office 3,556,555
Patented Jan. 19, 1971

3,556,555
MOTOR VEHICLE SUSPENSION
Brian Abbott and Harry Bernard Groves, Chelmsford,
Dennis Harris, Thorpe Bay, and John Bartholomew
Turnbull, West Hanningfield, England, assignors to Ford
Motor Company, Dearborn, Mich., a corporation of
Delaware
Filed Sept. 24, 1968, Ser. No. 762,001
Claims priority, application Great Britain, Oct. 13, 1967,
46,770/67
Int. Cl. B60g 9/04
U.S. Cl. 280—124
12 Claims

ABSTRACT OF THE DISCLOSURE

A motor vehicle suspension system with a spring assembly having a non-linear spring rate. The assembly comprises a pair of torsion bars that are interconnected by a rigid device and a resilient device. The resilient device is preloaded whereby the torsion bars are loaded at different rates to provide a variable spring rate.

BACKGROUND OF THE INVENTION

This invention relates to a spring assembly for motor vehicle suspension systems having a non-linear or variable rate spring system. A spring system of this type has the advantage that a low rate is provided for minor wheel deflections, however, the spring rate is increased when the amount of wheel deflection is increased. This construction provides a superior ride for a vehicle traveling over relatively smooth roads and an increase in stability and load-carrying ability for traveling over rough roads.

BRIEF SUMMARY OF THE DISCLOSURE

In a suspension system for a motor vehicle according to this invention, a spring assembly is provided for each wheel. The spring assembly includes first and second torsion bars and an intermediate spring. The intermediate spring construction is such that from a predetermined vehicle load initial movement of the wheel increases the stress in the first torsion bar alone until the stress in the intermediate spring reaches a certain value. When the stress in the intermediate spring reaches a first value, the second torsion bar is operatively connected in series with the first torsion bar so that further wheel movement stresses both torsion bars together. When the stress in the intermediate spring reaches a second value the second torsion bar is operatively disconnected from the first torsion bar whereupon further wheel movement increases the stress in the first torsion bar alone. When both bars are functioning, they have a combined spring rate that is lower than the rate of the first bar by itself.

Preferably, the first and second torsion bars are generally parallel. A rigid member interconnects the free axial ends of the bars and the free ends are embedded in a rubber mass which functions as an intermediate spring. The rubber mass is prestressed or preloaded so that it anchors the free end of the first bar against twisting about its axis until the stress in the bar overcomes the stress in the mass. Whereupon the free end of the first bar rocks the interconnecting rigid member and the second bar is connected in series with the first bar. When the stress in the rubber mass exceeds the torque transmitted to the second bar, then the first bar ceases to rock the interconnecting rigid member so that the second bar is operatively disconnected from the first bar.

Advantageously, the spring system may be used in the rear suspension of a motor vehicle having a rigid rear axle housing. Trailing arms are pivotally connected to the end of the rear axle and to the sprung part of the vehicle.

The forward end of each arm is fixed at its pivotal connection to the first torsion bar in the preferred embodiment of the invention.

BRIEF DESCRIPTION OF THE DRAWINGS

The many objects and advantages of the present invention will become apparent upon consideration of the following description and the attached drawings in which.

DETAILED DESCRIPTION OF THE PREFERRED EMBODIMENTS

Figure 1:
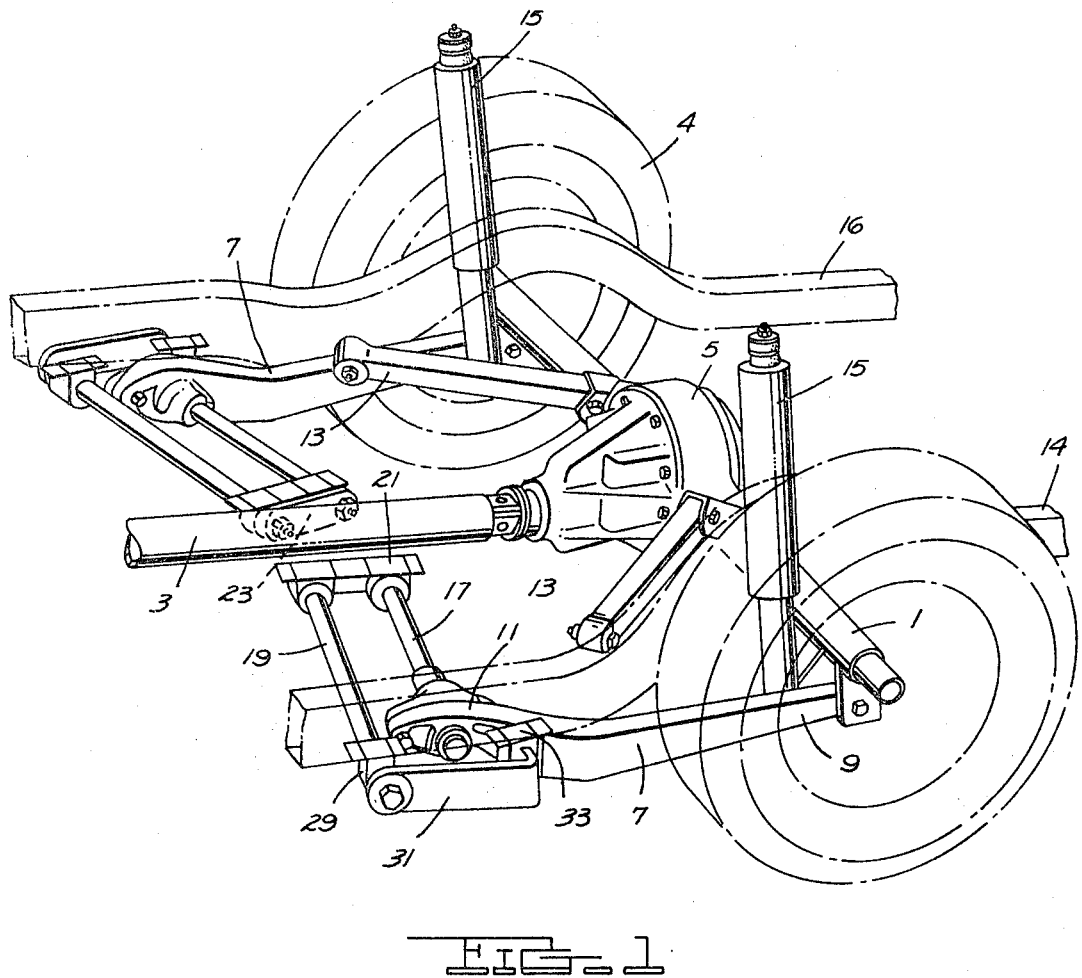
FIG. 1 is a perspective view of a rear suspension system for a motor vehicle constructed in accordance with the present invention.

FIG. 1 of the drawings discloses a rear suspension system for a motor vehicle that incorporates the presently preferred embodiment of this invention. The suspension system of FIG. 1 includes a conventional rear axle housing 1. The rear wheels 2 and 4 are rotatably mounted at the outer ends of the axle housing 1. The wheels 2 and 4 are driven from the vehicle's engine by means of a propeller shaft 3 which is connected to the input of a differential gear unit contained within the housing 5. The outputs of the differential are connected to the wheels 2, 4 by half shafts rotatably contained within the axle housing 1.

The rear axle 1 is located by two sets of trailing suspension arms. A lower pair of trailing arms 7 has its rear ends 9 pivotally connected to brackets secured to the underside of axle housing 1. The forward ends 11 of the lower trailing arms 7 are pivotally connected to the sprung part of the vehicle. The axle housing 1 is also located by two upper diverging suspension arms 13 which have their rear ends pivotally connected to the axle housing and their forward ends pivotally connected to the sprung part of the vehicle.

The rear axle housing 1 is thus located longitudinally and laterally with respect to the sprung part of the vehicle by the arms 7 and 13. Conventional shock absorbers 15 have their lower ends connected to the axle housing 1 and their upper ends connected to the chassis or body of the vehicle.

In the drawing, the sprung part or chassis of the vehicle includes left and right frame side rails 14 and 16.

Figure 3:
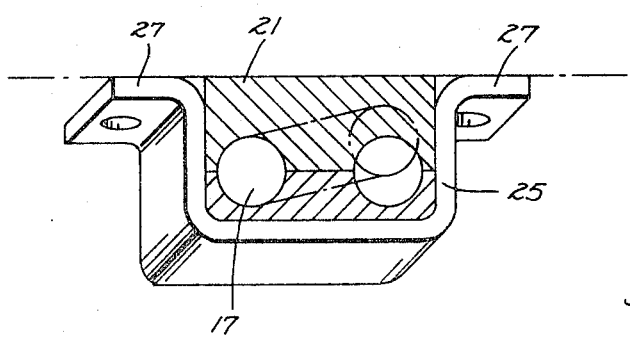
FIG. 3 is a detailed perspective view of a portion of the spring system of the suspensions of FIGS. 1 and 2.

In accordance with the present invention, resilient means is provided to support the vehicle chassis upon the wheels. The spring assembly for each wheel in FIG. 1 comprises first and second torsion bars 17 and 19 which are arranged generally transversely to the longitudinal center line of the vehicle. One end of the first bar 17 is connected to the trailing arm 7 at its forward end 11 so that the bar 17 is coaxial with the pivotal connection where the arm 7 is joined to the side rail 14 or 16. The other end of the first torsion bar 17 is bonded in a rubber mass 21 and is fixed to a rigid member 23. The rubber mass 21 is bonded to a bracket 25 (FIG. 3) and the bracket 25 is attached by bolts to the underside of the floor of the motor vehicle. The bolts extend through perforated flanges 27 which are formed in the bracket 25. The rubber mass 21 is compressed or prestressed so that the torque exerted by the end of the torsion bar 17 on the rubber 21 has to exceed a certain minimum value before the end of the bar 17 is able to rotate.

The member 23 is rigidily fixed to the end of the second bar 19 which is also imbedded in the rubber mass 21. The other end of the bar 19 extends through a rubber bushing 29 fixed to the floor of the vehicle and is secured to a bracket 31 which is fastened to the sprung mass of the vehicle by a rubber bushing 33. The bracket 31 functions as an anchor for the outer end of the torsion bar 19.

The operation of the spring arrangement in FIG. 1 is similar to that in FIG. 2 and will be described below after the following description of the construction of the FIG. 2 suspension. Insofar as possible, the same reference numerals have been used in FIG. 2 to designate functionally similar parts to those appearing in FIG. 1.

Figure 2:
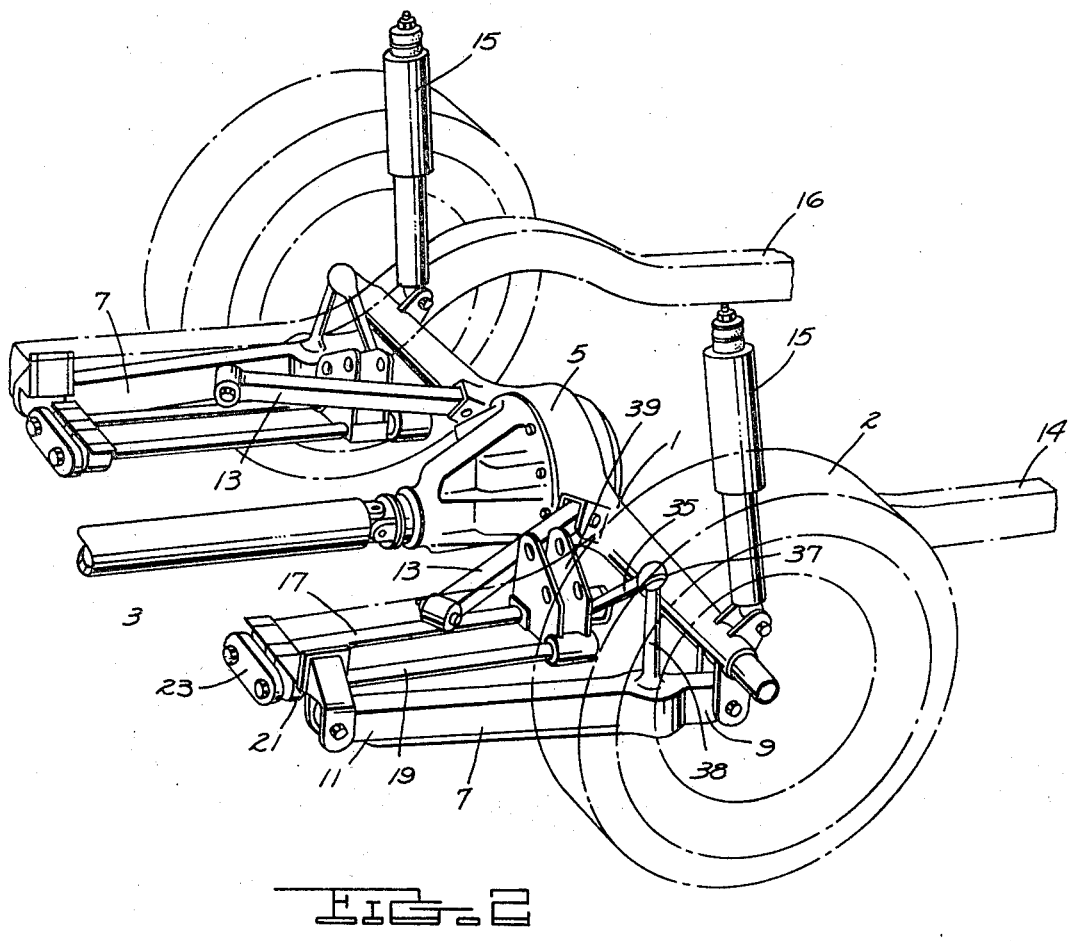
FIG. 2 is a perspective view of a rear suspension system for a motor vehicle embodying an alternate construction of the invention.

In FIG. 2, the torsion bars 17 and 19 which form a part of the spring assembly fo reach wheel 2 and 4 extend in a generally longitudinal direction rather than transversely. The spring assembly includes a lever arm 35 that is fixed to the end of the first torsion bar 17. The arm 35 has a spherical socket 37 which receives the upper end of a link 38. The upper end of the link 38 has a ball shape that is fitted within the socket and a lower end that is secured to the suspension arm 7. The arm 7 is pivotally connected to a bracket 39 fixed to the chassis of the vehicle. The forward end of the torsion bars 17 and 19 are bonded to a rubber mass 21 and are joined by a rigid member 23 as described above with reference to FIGS. 1 and 3. The second torsion bar 19 extends rearwardly from the member 23 and its rearward end is anchored in a socket in the bracket 39.

OPERATION

Figure 4:
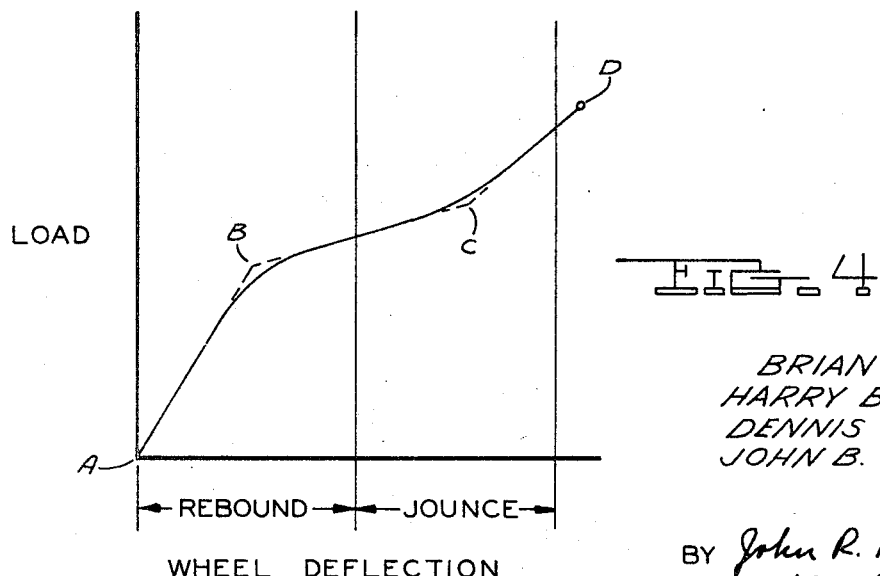
FIG. 4 is a load versus wheel deflection curve for the suspension systems of both FIGS. 1 and 2.

The suspensions in FIGS. 1 and 2 differ from each other in the arrangement of the spring assembly. The spring assemblies, however, function in an identical fashion. If the vehicle of FIG. 1 is jacked up so that neither of the rear wheels 2, 4 is on the ground then there is no load in the torsion bars 17. The trailing arm 7, wheels 2, 4 and axle housing 1 will be in the maximum rebound position. This position of the wheels 2, 4 is represented by the point A in the graph of FIG. 4. In that figure the abscissa represents the position or deflection of the wheel in jounce or rebound and the ordinate represents the load on the vehicle. The rubber mass 21 bonded in the bracket 25 is prestressed so as to resist rotation of the first torsion bar 17 as the wheels 2, 4 move upwardly in jounce from the position A.

As the wheels move upwardly from the position A to the position B, the rubber mass 21 prevents rotation of the free end of the torsion bar 17. Therefore, the effective length of each spring assembly is the length of the bar 17 alone. Between the points A and B on the graph of FIG. 4, bar 19 is inoperative and is operatively disconnected from the first bar 17.

When the wheels reach the position represented by the point B, the torsional stress in each bar 17 exceeds the prestress or preload of its rubber mass 21 with the result that the free ends of the bar 17 (inboard ends in FIG. 1 and forward ends in FIG. 2) begin to rotate. Further rotation of each bar 17 increases the stress in each of the rubber masses 21 and also rocks the members 23. The interconnecting members 23, as they are rocked, twist the second bar 19 and further increase the stress in each rubber mass 21. Thus, during movement of the wheels 2, 4 from the position B to the position C, the second torsion bars 19 are operatively connected in series with the first torsion bar 17. With the bars 17 and 19 serially connected the spring rate of the spring assembly between the positions B and C on the graph is considerably lower than the spring rate between the positions A and B.

When the wheels 2, 4 approach the position C in jounce deflection, the stress in the rubber mass 21 reaches a value at which any further increase in stress results in a progressively smaller displacement of the rubber until at a point just beyond the point C the rubber, for all practical purposes, ceases to yield. When this occurs the member 23 ceases to rock and the second torsion bars 19 are operatively disconnected from the first bars 17.

In addition, the free ends of the first bars 17 are, in effect, anchored against further rotation. As the wheels 2, 4 move further in jounce from the position C to the position D, the spring rate again increases to the value that it had between A and B which is the spring rate of the torsion bar 17 by itself. The elasticity of the rubber mass 21 smooths out the transition from one bar to two bar operation and conversely.

The wheel position B preferably corresponds to the load on the springs when only the driver is in the vehicle. The position C on the graph represents the load on the springs when the vehicle is fully loaded and is passing over a slight obstruction.

The foregoing description presents the presently preferred embodiments of this invention. Modifications and alterations of the invention may occur to those skilled in the art which will come within its scope and spirit.

We claim:

1. A motor vehicle suspension having sprung and unsprung components, a suspension means interconnecting said sprung and unsprung components, said suspension means including a variable rate spring means having first and second torsion springs, means connecting one end of said first torsion spring to said unsprung components, means connecting one end of said second torsion spring to said sprung components, the axes of rotation of the other ends of said torsion springs being spaced apart, rigid torque transfer means interconnecting said other ends of said torsion springs, resilient means interconnecting said other ends of said torsion springs.

2. A motor vehicle suspension according to claim 1 and including:
said torsion springs being arranged in a generally side-by-side relationship.

3. A motor vehicle suspension according to claim 1 and including:
said resilient means comprising a resilient mass surrounding said other ends of said torsion springs.

4. A motor vehicle suspension according to claim 1 and including:
said resilient means comprising a resilient mass surrounding said other ends of said torsion springs, means prestressing said resilient mass.

5. A motor vehicle suspension according to claim 1 and including:
said resilient means comprising a resilient mass surrounding said other ends of said torsion springs, support means including means prestressing said resilient mass connecting said resilient means to said sprung components.

6. A motor vehicle suspension according to claim 1 and including:
said suspension means including a suspension arm pivotally connected to said sprung components and said unsprung components, link means connecting said suspension arm and said one end of said first torsion spring, said link means being constructed to rotate said one end of said first torsion spring when said arm moves between jounce and rebound positions.

7. A motor vehicle suspension according to claim 1 and including:
said torsion springs being arranged in a generally side-by-side parallel relationship, said resilient means comprising a resilient mass surrounding said other ends of said torsion springs, means prestressing said resilient mass, support means connecting said resilient means to said sprung components, said suspension means including a suspension arm pivotally connected to said sprung components and said unsprung components, link means connecting said suspension arm and said one end of said first torsion spring, said link means being constructed to rotate said one end of said first torsion spring when said arm moves between jounce and rebound positions.

8. A motor vehicle suspension system having a chassis.

an axle housing, a wheel rotatably supported at each of the outer ends of said axle housing, a pair of wheel positioning suspension arms connected to said axle housing and to said chassis, variable rate spring means interconnecting each of said arms and said chassis, each of said spring means comprising a first torsion bar connected at one of its ends to one of said arms, a second torsion bar connected at one of its ends to said chassis, rigid means interconnecting the other ends of said first and second torsion bars, resilient means interconnecting said other ends and said other ends of said torsion bars having spaced apart axes of rotation.

9. A motor vehicle suspension having a sprung component, an unsprung component, means interconnecting said components and constructed to support said unsprung components for jounce and rebound movement relative to said sprung components, said means including variable rate spring means comprising first and second springs, means connecting said first spring to said unsprung components and constructed to impart a load into said first spring when said unsprung component is moved from rebound to jounce, means anchoring said second spring to said chassis, said first and second springs having adjacent ends, said adjacent ends having spaced axes of rotation, means interconnecting said adjacent ends of said first and second springs, said last mentioned means including mechanical means constructed to transfer a spring load from said first spring to said second spring and resilient means constructed to limit the movement of said mechanical means.

10. A motor vehicle suspension according to claim 9 and including:
said resilient means comprising a rubber like mass encompassing said adjacent ends.

11. A motor vehicle suspension according to claim 10 and including:
support means securing said resilient means to said sprung component.

12. A motor vehicle suspension according to claim 9 and including:
means for prestressing said resilient means to control the limitation of movement placed by it upon said mechanical means.

References Cited

UNITED STATES PATENTS

| | | | |
|---|---|---|---|
| 2,858,142 | 10/1958 | Schjolin et al. | 280—124(.3) |
| 3,029,091 | 4/1962 | Allison | 280—124(.3) |
| 3,259,201 | 7/1966 | Allison | 267—57X |
| 3,284,095 | 11/1966 | Allison | 267—57X |
| 3,339,909 | 9/1967 | Hanslip et al. | 267—57 |

A. HARRY LEVY, Primary Examiner

U.S. Cl. X.R.

180—71; 267—57